US011189065B2

(12) United States Patent
Abramson et al.

(10) Patent No.: US 11,189,065 B2
(45) Date of Patent: Nov. 30, 2021

(54) EDITOR FOR IMAGES WITH DEPTH DATA

(71) Applicant: INTEL CORPORATION, Santa Clara, CA (US)

(72) Inventors: Jonathan Abramson, Givat Yearim (IL); Avigdor Eldar, Jerusalem (IL); Omer Levy, Modiin (IL)

(73) Assignee: Intel Corporation, Santa Clara, CA (US)

( * ) Notice: Subject to any disclaimer, the term of this patent is extended or adjusted under 35 U.S.C. 154(b) by 547 days.

(21) Appl. No.: 15/488,939

(22) Filed: Apr. 17, 2017

(65) Prior Publication Data

US 2018/0300044 A1    Oct. 18, 2018

(51) Int. Cl.
*G06T 11/60* (2006.01)
*G06T 1/20* (2006.01)

(52) U.S. Cl.
CPC ............... *G06T 11/60* (2013.01); *G06T 1/20* (2013.01); *G06T 2200/24* (2013.01)

(58) Field of Classification Search
CPC .. H04N 17/00; H04N 5/7491; H04L 12/1827; G06T 2207/30208; G06T 7/80; G06T 11/60; G06T 1/20; G06T 2200/24; G02B 27/017; G02B 27/0093; G02B 2027/0178; G02B 2027/0138; G02B 2027/014; G02B 2027/0187; G06F 1/00; G06F 3/013
USPC ........................................................ 345/419
See application file for complete search history.

(56) References Cited

U.S. PATENT DOCUMENTS

| | | | | |
|---|---|---|---|---|
| 7,667,709 B2* | 2/2010 | Zimmer | ............. | G06T 1/20 |
| | | | | 345/536 |
| 8,947,423 B2* | 2/2015 | Ocali | ............. | G06T 1/00 |
| | | | | 345/418 |
| 9,264,702 B2* | 2/2016 | Liu | ............. | H04N 17/00 |
| 9,457,470 B2* | 10/2016 | Lundberg | ............. | B25J 9/1692 |
| 2010/0201681 A1* | 8/2010 | Criminisi | ............. | G06T 15/20 |
| | | | | 345/419 |
| 2012/0263377 A1* | 10/2012 | Finlayson | ............. | G06F 17/10 |
| | | | | 382/162 |
| 2013/0121559 A1* | 5/2013 | Hu | ............. | G06T 7/593 |
| | | | | 382/154 |
| 2014/0118557 A1* | 5/2014 | Lee | ............. | H04N 17/002 |
| | | | | 348/175 |

(Continued)

OTHER PUBLICATIONS

Luong, Q-T., and Olivier D. Faugeras. "Self-calibration of a moving camera from point correspondences and fundamental matrices." International Journal of computer vision 22, No. 3 (1997): 261-289.*

(Continued)

*Primary Examiner* — Hai Tao Sun
(74) *Attorney, Agent, or Firm* — Hanley, Flight & Zimmerman, LLC

(57) ABSTRACT

The present disclosure provides at least an apparatus for a depth enhanced image editing. In an example, the apparatus includes a processor and a storage, comprising instructions that when executed with the processor cause the apparatus to store a received depth enhanced image. In an example, the depth enhanced image comprises image data, depth data, and calibration data. The apparatus may apply an edit to the image data and the calibration data without editing the depth data in response to a request for an image edit. The apparatus may further return an edited depth enhanced image.

25 Claims, 6 Drawing Sheets

(56) References Cited

U.S. PATENT DOCUMENTS

| | | | |
|---|---|---|---|
| 2014/0225985 A1* | 8/2014 | Klusza | H04N 13/0207 |
| | | | 348/43 |
| 2016/0073080 A1* | 3/2016 | Wagner | G06T 5/006 |
| | | | 348/47 |
| 2016/0212418 A1* | 7/2016 | Demirdjian | H04N 17/002 |
| 2017/0034502 A1* | 2/2017 | Aurongzeb | H04N 13/243 |
| 2017/0064287 A1* | 3/2017 | Borisov | G06T 15/04 |
| 2017/0103509 A1* | 4/2017 | Scharfenberger | G06T 7/33 |
| 2017/0287166 A1* | 10/2017 | Claveau | H04N 17/002 |

OTHER PUBLICATIONS

Houman, A, "The eXtensible Device Metadata (XDM) Specification—Version 1.0", https://software.intel.com/en-us/articles/the-extensible-device-metadata-xdm-specification-version-10, date viewed Dec. 21, 2016, Added to Website Dec. 7, 2015, 3 pages, USA.

McHugh, Sean (Founder), "Digital Image Interpolation", http://www.cambridgeincolour.com/tutorials/image-interpolation.htm, date viewed Dec. 21, 2016, 13 pages, USA.

* cited by examiner

100

EDITOR FOR IMAGES WITH DEPTH DATA

TECHNICAL FIELD

The present techniques relate generally to editing images with depth data. More specifically, the present techniques relate to editing images with depth data in a way that preserves the original depth data to protect the depth data from unintended artifacts caused by the editing process.

BACKGROUND ART

Images including digital photographs and digital video can include visual image data and depth data. As used herein, visual image can include color data such as Red Green Blue (RGB) levels, Cyan Magenta Yellow and Key/black (CMYK) levels, brightness, value, and other characteristics that are viewable in a 2D image. Depth data can be associated with an image and can include a measured distance of the image from a camera capturing the image. While a camera model may be used as a fixed point of distance in captured images, a specified point may also be used if an image is generated.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
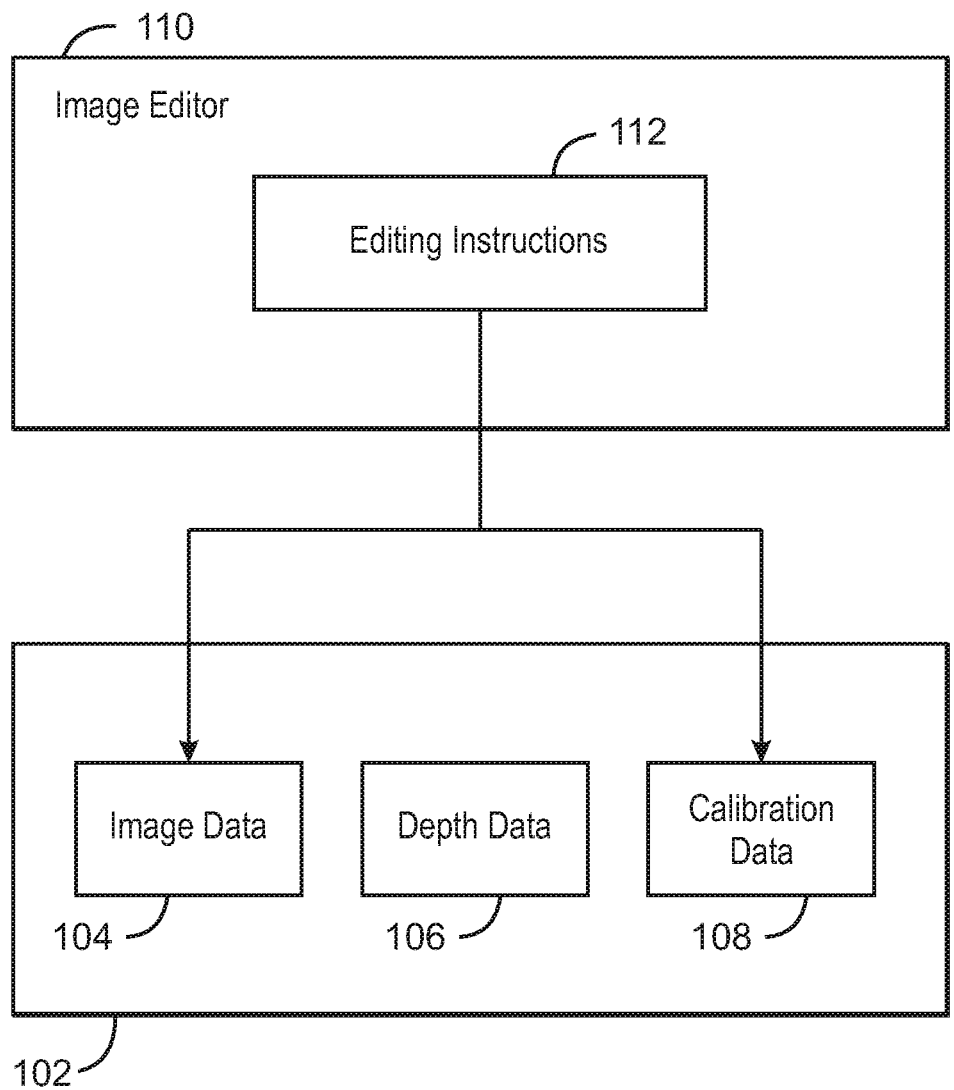
FIG. 1 is a schematic of an example depth image edit.

A depth enhanced photograph is created by assembling images from both image data, such as red green blue data (RGB), and depth data. Taken together this example depth enhanced photograph may be referred to as a red green blue depth (RGBD) image. While the term photograph is used here, additional image types are intended. The actions performed with a photograph could be done with generated images and captured images not obtained through photography technology directly. Similarly, many types of image data and storage formats can contain this information.

As disclosed herein, images with depth data may be edited where the edits affect the image data and the calibration data in the container. Edits that may use the disclosed technique include rotation, cropping, flipping, skewing, shearing and any other continuous linear operations, for example. Linear transformations and operations affecting the image data and the calibration data can leave original depth data untouched and thereby avoid inflicting errors through edits directly made to the depth data.

Applying edits equally to image data and depth data can create errors in the depth data that may compound and accumulate. For example, depth data of an image can experience errors when depth data resolution is smaller than the image data. When depth data has a lower resolution, operations like rotation and scaling affect both depth data and image data. The larger resolution of image data can effect these changes with high granularity and little lost in distortion. Depth data with lower resolution experiences distortion with a great loss of data since each data unit affected represents a larger share of the depth data corresponding to an image. Further, an interpolation method applied to depth data through a "nearest neighbor" approach may exhibit "tears" on object boundaries. Further, using a smoother linear/bi-cubical interpolation method might yield invalid depth values on object boundaries. Each of these errors for an edit on depth data directly can introduce errors that can compound and accumulate through the frequency of the edits being repeated and combined.

In this disclosure, numerous specific details are set forth, such as examples of specific types of processors and system configurations, specific hardware structures, specific instruction types, specific system components, etc. in order to provide a thorough understanding of the present disclosure. It can be apparent, however, to one skilled in the art that these specific details need not be employed to practice the presently disclosed techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the presently disclosed techniques.

FIG. 1 is a schematic of an example depth image edit 100. Depth image edit 100 may be a continuous linear operation such as a rotation, flip, or shear edit. The subject of the edit 100 can be an image with depth data which can be stored in a container 102. The container 102 includes image data 104, depth data 106, and calibration data 108. Image data 104 can be data that is visual in nature and can include color and intensity information. One example of image data 104 includes RGB data. Depth data 106 refers to a depth from a fixed point to an image. In an example, the fixed point may be a camera capturing the image. The fixed point may be an arbitrary point in the case of generated images. Depth data 106 can include information captured from a camera or from a physically separate and remote source. Depth data 106 can include depth information gathered from different technologies including LIDAR (Light Detection and Ranging or Light Imaging, Detection and Ranging), RADAR (Radio Detection and Ranging or Radio Direction and Ranging), or infrared technologies, for example.

The image data 104 and depth data 106 can be combined to create a depth enhanced image. Depth enhanced images and photographs can be stored in the container 102, and may be stored in a format such as an eXtensible Device Metadata (XDM) format. Containers such as container 102 using formats other than the XDM format can also be used, with the container format including image data 104, depth data 106, and calibration data 108. The calibration data 108 can be camera calibration data in the case of photographs, for example. The calibration data 108 can describe geometric relations between the image data and the depth data of an image. Calibration data 108 can be used to connect and align image data 104 and depth data 106. For example, calibration data 108 can be used to align RGB image data and depth data 106 on a single frame.

An image editor 110 can be used to perform depth image edit 100. The performance of depth image edit 100 can be caused by the carrying out of editing instructions 112 stored in the image editor 110. The editing instructions 112 are shown in FIG. 1, for example, as affecting the image data 104 and the calibration data 108 and not the depth data 106. In this way, the depth data 106 is not itself affected, however the mapping of the image data 104 to the depth data 106 may be changed through the alteration of the calibration data 108. Once the image data 104 and calibration data 108 have been edited, then it is possible for a standalone application using image data 104, depth data 106, and calibration data 108 to align the original depth data to the intended edit using the updated calibration data 108. In an example, in the case of an image rotation, the calibration data 108 can be edited so that the calibration data reads as if the camera itself were tilted to the intended degree during editing. Calibration data 108 can have, for example, large floating point data types and need not be displayed, and accordingly does not need to be rounded or averaged to a shortened or rounded value due to editing. This can allow repeated edits to be applied to the calibration data 108 without accumulation of error. Further, the original depth data can be preserved for later reference and an image can be reverted back to an original state.

Figure 2:
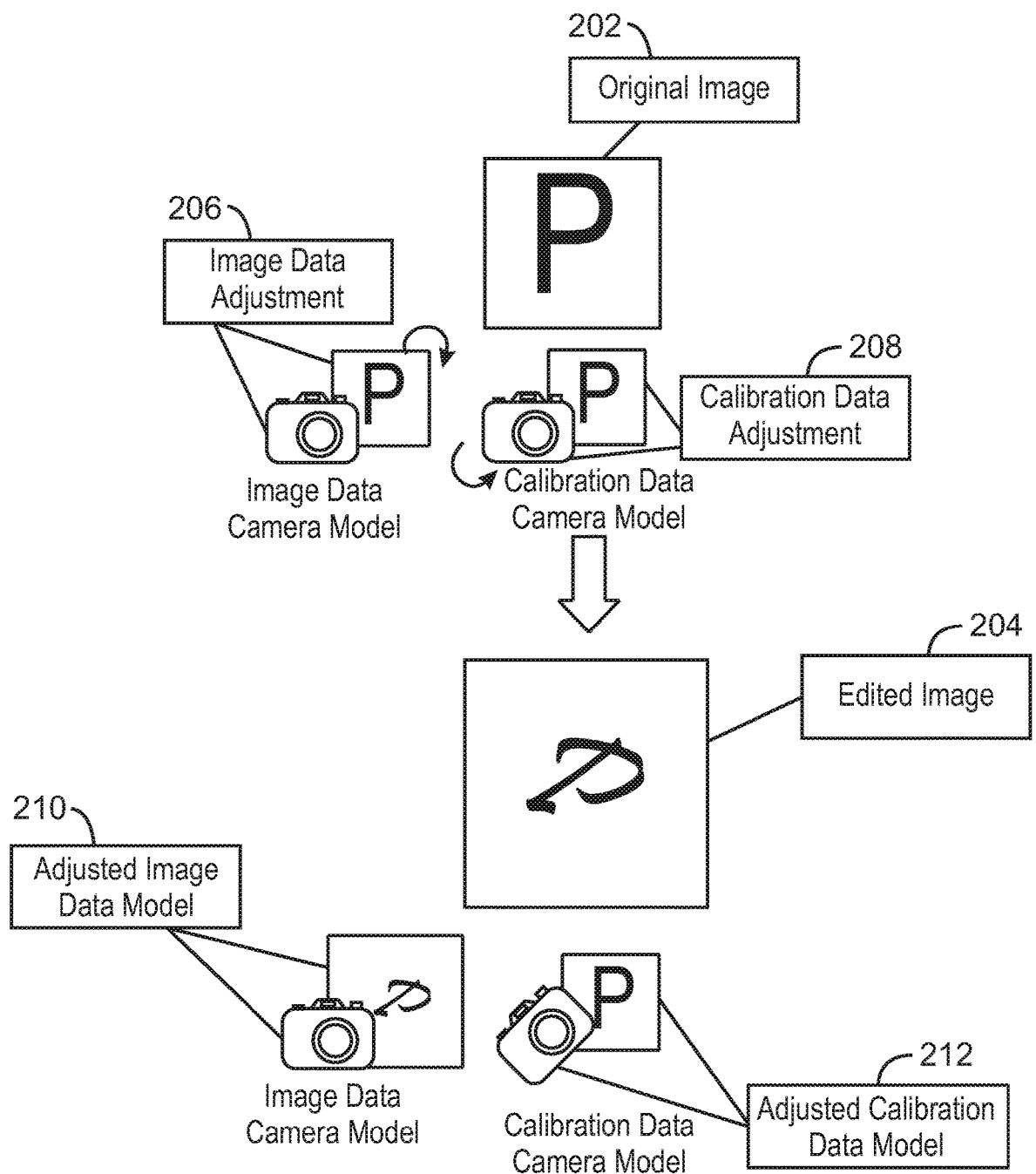
FIG. 2 is a schematic of an example depth image edit model for a rotation operation.

FIG. 2 is a schematic of an example depth image edit model 200 for a rotation operation. While a rotation operation is shown here, other linear transformations may use similar techniques.

A depth image edit model 200 is shown in FIG. 2 using a pinhole camera model to illustrate a rotation operation by editing image data such as image data 104 and calibration data such as calibration data 108, for example, while leaving depth data such as depth data 106 intact.

Given an original image 202 where an image such as the letter 'P' is to be rotated, the edited image 204 shows a rotated version of the letter 'P'. As discussed above, the appearance of the edited image 204 can be edited through operations performed on the image data 104, for example. If the image is a depth enhanced photograph and the depth image edit model 200 is making use of a pinhole camera model, an image data adjustment 206 may be used to edit image data. The image data adjustment 206 illustrates how the image itself, rather than data related to a camera orientation, can be edited, with the arrow indicating the rotation of the original image 202.

A rotation operation on a depth enhanced photograph may also perform a calibration data adjustment 208. The calibration data adjustment 208 illustrates that the rotation is not applied to the original image 202, but through a rotation of an illustrated camera. The rotation of the illustrated camera indicated in the calibration data adjustment 208 represents the edits to camera data that indicates a proper calibration and alignment of depth and image data.

The results of the image data adjustment 206 and the calibration data adjustment 208 are seen in the adjusted image data model 210 and the adjusted calibration data model 212, respectively. As the image data adjustment 206 affected the original image 202 rather than the orientation of a camera capturing that image, the illustration of the adjusted image data model 210 shows the document rather than the camera turned. Comparatively, the adjusted calibration data model 212 shows a rotation of a model camera, such that, from the model camera's perspective, the original image 202 would appear to have the depth of the edited image 204, while the depth data of the original image 202 is intact and un-rotated.

In an example of a rotation operation, an original image 202 can be rotated clockwise $\theta$ radians. For the other models, such as calibration data models, representing different types of data, rotation may be simulated by the cameras themselves being rotated by $\theta$ radians counter-clockwise, without rotating the images themselves.

Rotating calibration data includes generating a 2×2 rotation matrix, such as $$R = \begin{bmatrix} \cos\theta & -\sin\theta \\ \sin\theta & \cos\theta \end{bmatrix}$$

and a 3×3 rotation matrix, such as $$R' = \begin{bmatrix} \cos\theta & -\sin\theta & 0 \\ \sin\theta & \cos\theta & 0 \\ 0 & 0 & 1 \end{bmatrix}$$

where R and R' are matrices used in further calculations of a rotation operation. These operations can include an update to intrinsic parameters of a camera model through an update to data about the camera stored in the calibration data.

As used herein, intrinsic parameters in a pinhole camera model can include information used to model the data captured by a single camera and its settings. The intrinsic parameters in a pinhole camera model can include a model of the camera optics such as the type of lens and the type of image capture. Intrinsic parameters in a pinhole camera model can include the number of pixels to be captured, the size of the image, and the sensor width and height. Intrinsic parameters can include a principal point which can be expressed in the form of coordinate data indicating the center of the lens. Intrinsic parameters about sensors may be stored as variables Px and Py, which can be used to indicate a displacement of the sensor from its principal point. Intrinsic parameters can include focal length of a camera model and a radial dispersion.

For example, an intrinsic parameters update can include assigning a camera model a principal point (P) indicating the location of projection of the focal point on the image obtained by the camera during image capture. In an example, principal point P can be a 2D vector and P can be at the center of the camera model's image. The update to the intrinsic parameters can then multiply the matrix R by the principal point P to obtain updated intrinsic parameters.

In another example, a camera model can update a radial distortion parameter (K). The initial radial distortion vector may be a 2D vector found in the camera. In this example, the camera model can update the radial distortion by multiplying the vector K by the matrix R for an update to this intrinsic parameter of the camera model.

In addition to an update of intrinsic parameters in a calibration data edit operation, such as a rotation, the extrinsic parameters can update in an edit operation of a depth enhanced image. In an example, the translation vector can be a 3D vector. This extrinsic variable can be updated by multiplying the translation vector T and the matrix R' in order to update this extrinsic parameter.

Transformation operations using a camera model may also involve generation of a rotation matrix Q indicating the rotation linear transformation from one camera vantage point to another vantage point by the same or another camera. In an example, rotation matrix Q can be a 3×3 rotation matrix. Updates to this rotation matrix in the camera model can be accomplished through multiplication of the rotation matrix Q with the matrix R'.

Through these matrix operations and linear transformations applied to both intrinsic and extrinsic parameters of a camera, calibration data can be updated to correspond to the edits applied to image data. As a result of these or other linear transformations, an alignment process can use the calibration data to align a camera modeling image data and a camera modeling depth data. While these techniques can be used for rotation, similar linear transformations to intrinsic and extrinsic parameters of a camera can be used for other editing operations, including cropping and flipping an image. In these other operations, the matrices used in these operations could be replaced with matrices appropriate for the specific transformation requested.

Figure 3:
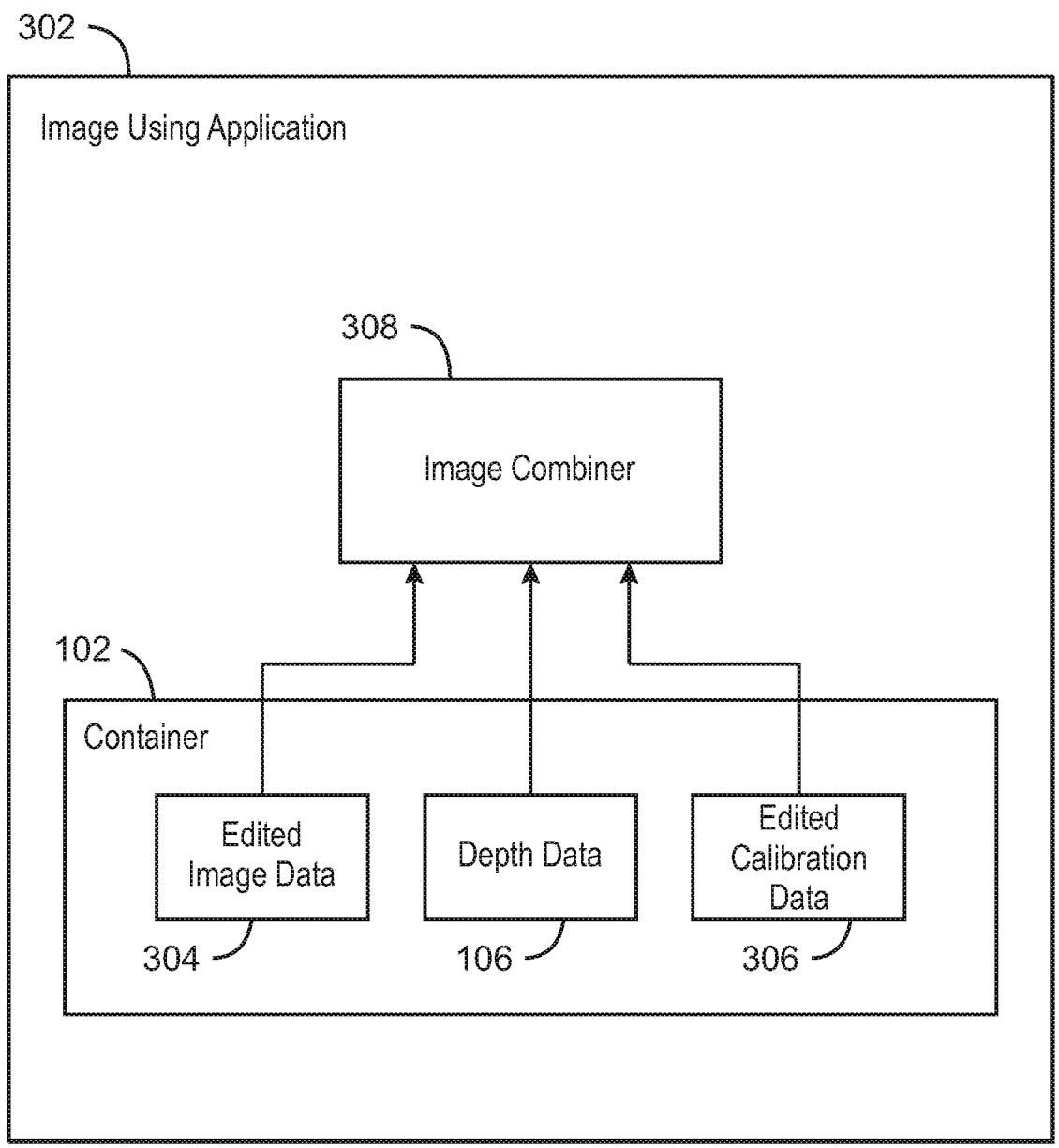
FIG. 3 is a schematic for display of an edited depth image.

FIG. 3 is a schematic for display 300 of an edited depth image. Like numbered items are as described in FIG. 1.

The image using application 302 can be an application that displays an image and depth data. This can include virtual reality and augmented reality applications, for example. The image using application 302 may have received a depth enhanced image stored in the container 102. As shown here, the depth enhanced image has been edited and thus includes edited image data 304, the depth data 106 which has not been edited, as well as edited calibration data 306. The image using application 302 can combine this data with an image combiner 308 which intakes the edited image data 304, the depth data 106, and the edited calibration data 306. The image combiner 308 can use the edited calibration data 306 to align the edited image data 304 to the depth data 106 which has not been edited. The transformations caused by the edits to the calibration data can affect the alignment of the edited image data 304 to the depth data 106 and makes it appear as though the depth data underwent the corresponding edits as the edited image data 304.

In an example, an application that can handle image data, depth data, and calibration data can match each point of image data to a point of depth data using the calibration data. As discussed above, by editing the calibration data, any application with these abilities can still see the edits, with none of the loss or error compounding introduced by doing edits on the image data, and instead using the calibration data.

Figure 4:
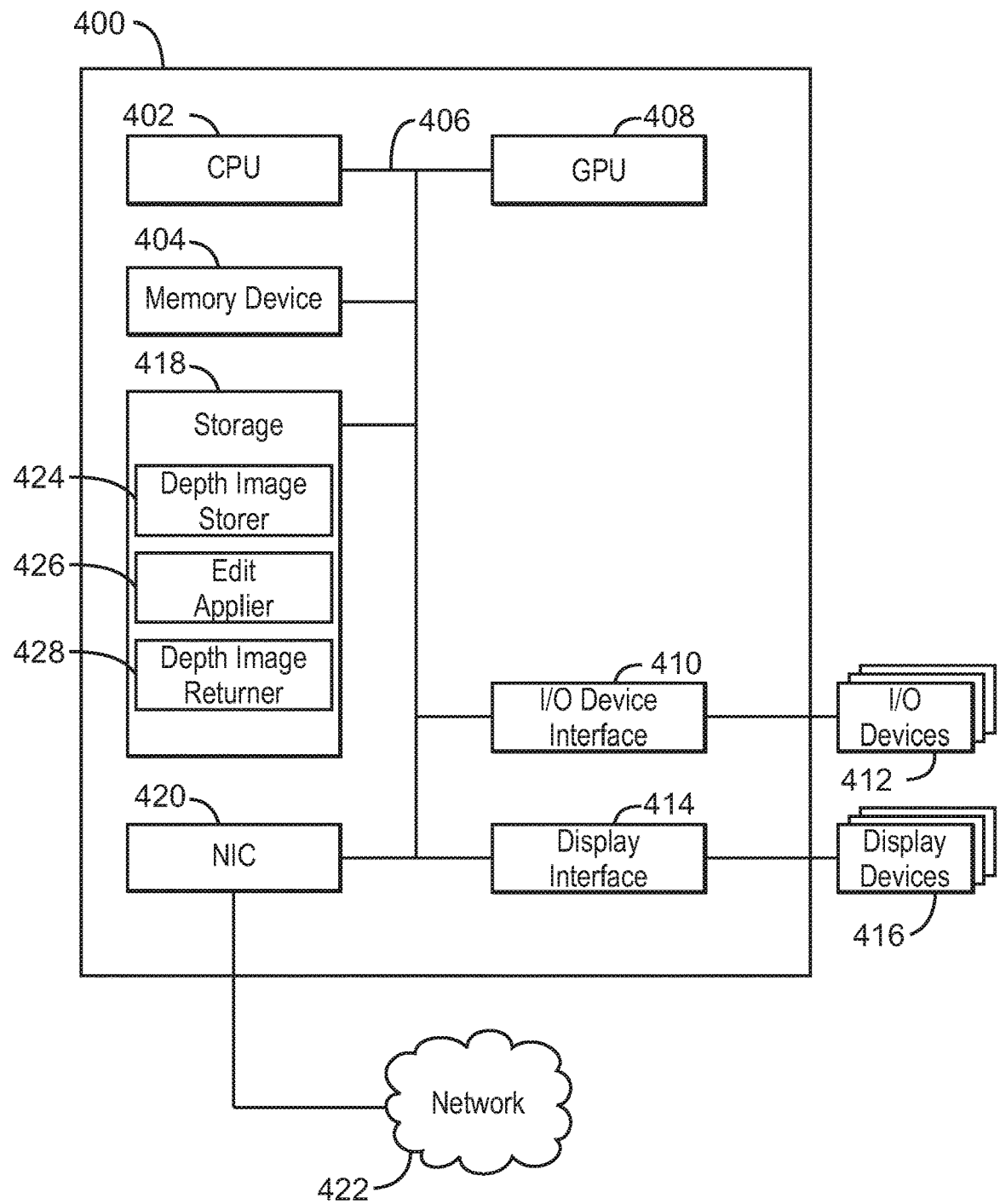
FIG. 4 is a block diagram illustrating an example computing device for editing depth images.

FIG. 4 is a block diagram illustrating an example image editing apparatus and device for editing depth images. The computing device 400 may be, for example, a laptop computer, desktop computer, tablet computer, mobile device, or server, among others. The computing device 400 may include a central processing unit (CPU) 402 that is configured to execute stored instructions, as well as a memory device 404 that stores instructions that are executable by the CPU 402. The CPU 402 may be coupled to the memory device 404 by a bus 406. Additionally, the CPU 402 can be a single core processor, a multi-core processor, a computing cluster, or any number of other configurations. Furthermore, the computing device 400 may include more than one CPU 402. The memory device 404 can include random access memory (RAM), read only memory (ROM), flash memory, or any other suitable memory systems. For example, the memory device 404 may include dynamic random access memory (DRAM).

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400.

The memory device 404 can include random access memory (RAM), read only memory (ROM), flash memory, or any other suitable memory systems. For example, the memory device 404 may include dynamic random access memory (DRAM).

The CPU 402 may also be connected through the bus 406 to an input/output (I/O) device interface 410 configured to connect the computing device 400 to one or more I/O devices 412. The I/O devices 412 may include, for example, a keyboard and a pointing device, wherein the pointing device may include a touchpad or a touchscreen, among others. The I/O devices 412 may be built-in components of the computing device 400, or may be devices that are externally connected to the computing device 400. In some examples, the memory 404 may be communicatively coupled to I/O devices 412 through direct memory access (DMA). The I/O devices 412 may also be a camera for detecting displayed calibration-pattern images. The camera can be a camera detecting visible light, infrared light, or any combination of electromagnetic detectable signals. The I/O devices 412 could include multiple camera devices including, for example, a depth camera and an RGB camera. The cameras may generate image data, depth data, and corresponding calibration data. In an example, an application running on the CPU 402 may use the techniques described herein to edit or otherwise modify the image data.

The CPU 402 may also be linked through the bus 406 to a display interface 414 configured to connect the computing device 400 to a display device 416. The display device 416 may include a display screen that is a built-in component of the computing device 400. The display device 416 may also include a computer monitor, television, or projector, among others, that is internal to or externally connected to the computing device 400. The projector may display a stored calibration-pattern image to a projection surface.

The computing device also includes a storage device 418. The storage device 418 is a physical memory such as a hard drive, an optical drive, a solid state storage device, a thumb drive, an array of drives, or any combinations thereof. The storage device 418 may also include remote storage drives.

The computing device 400 may also include a network interface controller (NIC) 420. The NIC 420 may be configured to connect the computing device 400 through the bus 406 to a network 422. The network 422 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

A CPU 402 can execute instructions in the storage 418 to activate a depth image storer 424 that instructs the storage a received depth enhanced image comprising image data, depth data, and calibration data. In an example, the depth data indicates a distance from a fixed point, where the fixed point is used as a principal point in the calibration data. The calibration data may be stored as a floating point number and the image data may be stored as integer values.

A CPU 402 can execute instructions in the storage 418 to activate an edit applier 426 that instructs the application of an edit to the image data and the calibration data without editing the depth data in response to a request for an image edit. In an example, the edit is a linear transformation of intrinsic parameter through matrix multiplication. In an example, the edit is a linear transformation of extrinsic parameter through matrix multiplication. The edit may be linear transformations of many varieties and could include at least one or more of rotation, cropping, flipping, skewing, or shearing.

A CPU 402 can execute instructions in the storage 418 to activate a depth image returner 428 that to instructs the returning of an edited depth enhanced image in a container. In an example, the edited depth enhanced image includes an original set of calibration data so that linear transformation operations made on the depth data, the image data, and calibration data can be reverted to an original depth enhanced image. The container may further include an indicator that the edited calibration data is read prior to the depth data and edited image data. The container may be formatted to have an extensible device metadata format.

The block diagram of FIG. 4 is not intended to indicate that the computing device 400 is to include all of the components shown in FIG. 4. Rather, the computing device 400 can include fewer or additional components not illustrated in FIG. 4, such as additional USB devices, additional guest devices, and the like. The computing device 400 may include any number of additional components not shown in FIG. 4, depending on the details of the specific implementation. Furthermore, any of the functionalities of the CPU 402 may be partially, or entirely, implemented in hardware and/or in a processor.

Figure 5:
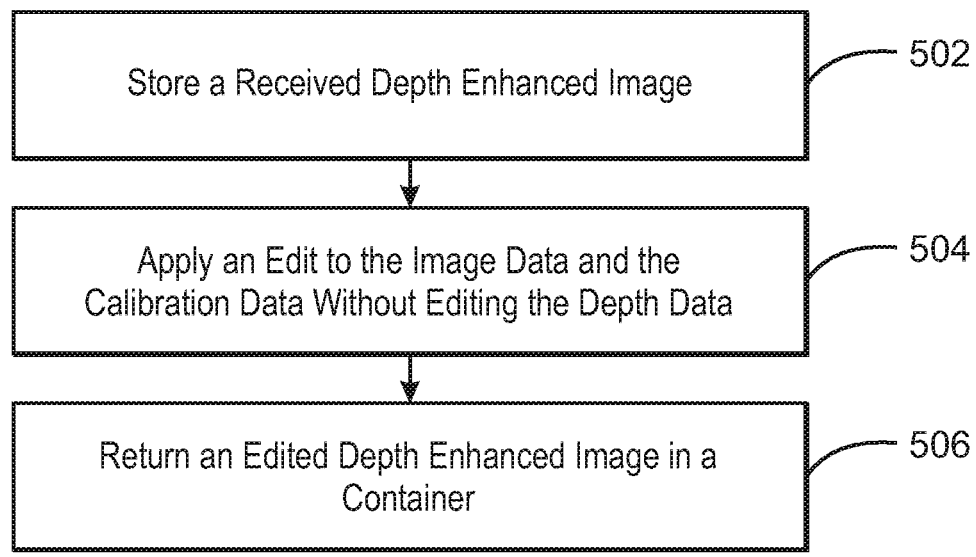
FIG. 5 is a flow chart illustrating a method for editing depth images.

FIG. 5 is a flow chart illustrating a method for editing depth images. The example method is generally referred to by the reference number 500 and can be implemented using the apparatus 400 of FIG. 5 above.

At block 502, the method includes storing a received depth enhanced image comprising image data, depth data, and calibration data. In an example, the depth data indicates a distance from a fixed point, where the fixed point is used as a principal point in the calibration data. The calibration data may be stored as a floating point number and the image data may be stored as integer values.

At block 504, the method includes applying an edit to the image data and the calibration data without editing the depth data in response to a request for an image edit. In an example, the edit is a linear transformation of intrinsic parameter through matrix multiplication. In an example, the edit is a linear transformation of extrinsic parameter through matrix multiplication. The edit may be linear transformations of many varieties and could include at least one or more of rotation, cropping, flipping, skewing, or shearing.

At block 506, the method includes returning an edited depth enhanced image in a container. In an example, the edited depth enhanced image includes an original set of calibration data so that linear transformation operations made on the depth data, the image data, and calibration data can be reverted to an original depth enhanced image. The container may further include an indicator that the edited calibration data is read prior to the depth data and edited image data. The container may be formatted to have an extensible device metadata format.

Figure 6:
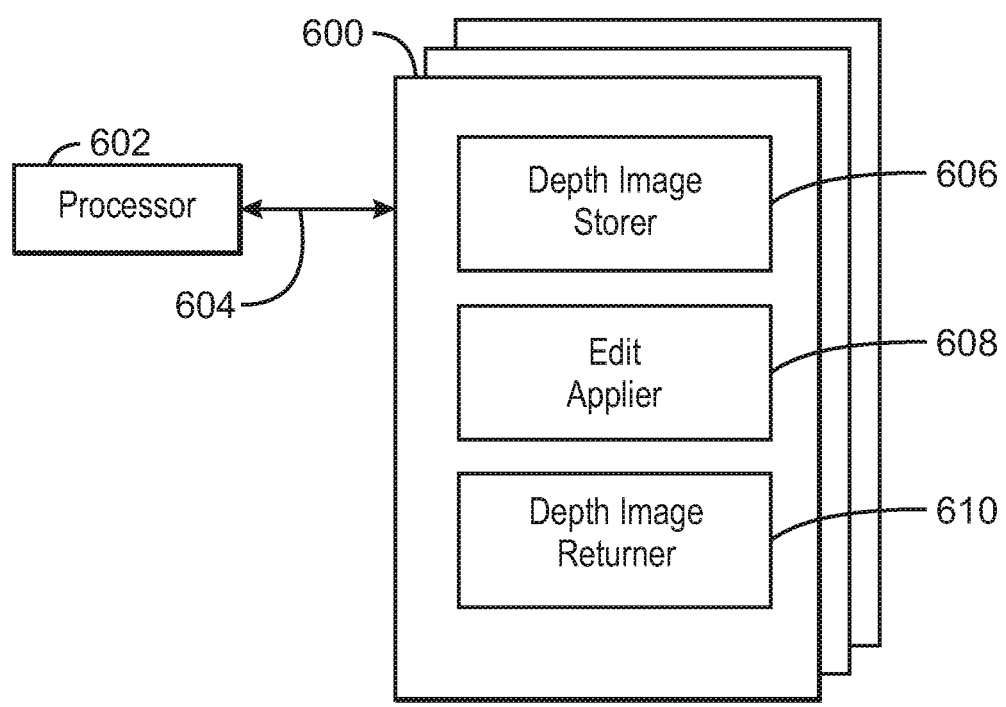
FIG. 6 is a block diagram showing computer readable media that stores code for editing depth images.

FIG. 6 is a block diagram showing computer readable media that stores code for editing depth images. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media. However, in any case, the computer readable media do not include transitory media such as carrier waves, signals, and the like.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

The various software components discussed herein may be stored on one or more computer readable media 600, as indicated in FIG. 6. For example, a depth image storer 606 can be used to store a received depth enhanced image comprising image data, depth data, and calibration data. In an example, the depth data indicates a distance from a fixed point, where the fixed point is used as a principal point in the calibration data. The calibration data may be stored as a floating point number and the image data may be stored as integer values.

The processor 602 can execute instructions stored in the edit applier 608 to apply an edit to the image data and the calibration data without editing the depth data in response to a request for an image edit. In an example, the edit is a linear transformation of intrinsic parameter through matrix multiplication. In an example, the edit is a linear transformation of extrinsic parameter through matrix multiplication. The edit may be linear transformations of many varieties and could include at least one or more of rotation, cropping, flipping, skewing, or shearing.

The processor 602 can execute instructions stored in the depth image returner 610 to return an edited depth enhanced image in a container. In an example, the edited depth enhanced image includes an original set of calibration data so that linear transformation operations made on the depth data, the image data, and calibration data can be reverted to an original depth enhanced image. The container may further include an indicator that the edited calibration data is read prior to the depth data and edited image data. The container may be formatted to have an extensible device metadata format.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an image editing apparatus for a depth enhanced image including: a processor, a storage including instructions that when executed with the processor cause the apparatus to: The image editing apparatus also includes store a received depth enhanced image including image data, depth data, and calibration data. The image editing apparatus also includes apply an edit to the image data and the calibration data without editing the depth data in response to a request for an image edit. The image editing apparatus also includes return an edited depth enhanced image. Other embodiments of this aspect include corresponding computer systems, apparatus, and computer programs recorded on one or more computer storage devices, each configured to perform the actions of the methods.

Implementations may include one or more of the following features. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including storage to store the calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. The method where the edit is a linear transformation of intrinsic parameter through matrix multiplication. The method where the edit is a linear transformation of extrinsic parameter through matrix multiplication. The method where the depth data indicates a distance from a fixed point, where the fixed point is used as a principal point in the calibration data. The method where the edit is at least one or more of rotation, cropping, flipping, skewing, or shearing. The method including storing the calibration data in a storage as a floating point number. The method where the image data is stored as integer values. The method where the edited depth enhanced image includes an original set of calibration data with linear transformation operations made on the depth data, the image data, and calibration data for the reversion to an original depth enhanced image. The method where the edited depth enhanced image is returned in a container including an indicator that the edited calibration data is read prior to the depth data and edited image data. The method where the edited depth enhanced image is returned in a container formatted to have an extensible device metadata format. The computer-readable medium where the edit is a linear transformation of intrinsic parameter through matrix multiplication. The computer-readable medium where the edit is a linear transformation of extrinsic parameter through matrix multiplication. The computer-readable medium where the depth data indicates a distance from a fixed point, where the fixed point is used as a principal point in the calibration data. The computer-readable medium where the edit is at least one or more of rotation, cropping, flipping, skewing, or shearing. The computer-readable medium where the calibration data is stored in the computer-readable medium as a floating point number. The computer-readable medium where the image data is stored as integer values. The computer-readable medium where the edited depth enhanced image includes an original set of calibration data with linear transformation operations made on the depth data, the image data, and calibration data for the reversion to an original depth enhanced image. The computer-readable medium where the edited depth enhanced image is returned in a container including an indicator that the edited calibration data is read prior to the depth data and edited image data. The computer-readable medium where the edited depth enhanced image is returned in a container formatted to have an extensible device metadata format. The system where the edit is a linear transformation of an intrinsic parameter through matrix multiplication. The system where the edit is a linear transformation of an extrinsic parameter through matrix multiplication. The system where the depth data indicates a distance from a fixed point, where the fixed point is used as a principal point in the calibration data. The system where the edit is at least one or more of rotation, cropping, flipping, skewing, or shearing. The system including storage to store the calibration data as a floating point number. The system where the image data is stored as integer values. The system where the edited depth enhanced image includes an original set of calibration data with linear transformation operations made on the depth data, the image data, and calibration data for the reversion to an original depth enhanced image. The system where the edited depth enhanced image is returned in a container including an indicator that the edited calibration data is read prior to the depth data and edited image data. The system where the edited depth enhanced image is returned in a container formatted to have an extensible device metadata format. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including means for storing calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. Implementations of the described techniques may include hardware, a method or process, or computer software on a computer-accessible medium.

Example 2

One general aspect includes a method for editing depth enhanced images including: storing a received depth enhanced image including image data, depth data, and calibration data. The method also includes applying an edit to the image data and the calibration data without editing the depth data in response to a request for an image edit. The method also includes returning an edited depth enhanced image. Other embodiments of this aspect include corresponding computer systems, apparatus, and computer programs recorded on one or more computer storage devices, each configured to perform the actions of the methods.

Implementations may include one or more of the following features. The method where the edit is a linear transformation of intrinsic parameter through matrix multiplication. The method where the edit is a linear transformation of extrinsic parameter through matrix multiplication. The method where the depth data indicates a distance from a fixed point, where the fixed point is used as a principal point in the calibration data. The method where the edit is at least one or more of rotation, cropping, flipping, skewing, or shearing. The method including storing the calibration data in a storage as a floating point number. The method where the image data is stored as integer values. The method where the edited depth enhanced image includes an original set of calibration data with linear transformation operations made on the depth data, the image data, and calibration data for the reversion to an original depth enhanced image. The method where the edited depth enhanced image is returned in a container including an indicator that the edited calibration data is read prior to the depth data and edited image data. The method where the edited depth enhanced image is returned in a container formatted to have an extensible device metadata format. The computer-readable medium where the edit is a linear transformation of intrinsic parameter through matrix multiplication. The computer-readable medium where the edit is a linear transformation of extrinsic parameter through matrix multiplication. The computer-readable medium where the depth data indicates a distance from a fixed point, where the fixed point is used as a principal point in the calibration data. The computer-readable medium where the edit is at least one or more of rotation, cropping, flipping, skewing, or shearing. The computer-readable medium where the calibration data is stored in the computer-readable medium as a floating point number. The computer-readable medium where the image data is stored as integer values. The computer-readable medium where the edited depth enhanced image includes an original set of calibration data with linear transformation operations made on the depth data, the image data, and calibration data for the reversion to an original depth enhanced image. The computer-readable medium where the edited depth enhanced image is returned in a container including an indicator that the edited calibration data is read prior to the depth data and edited image data. The computer-readable medium where the edited depth enhanced image is returned in a container formatted to have an extensible device metadata format. The system where the edit is a linear transformation of an intrinsic parameter through matrix multiplication. The system where the edit is a linear transformation of an extrinsic parameter through matrix multiplication. The system where the depth data indicates a distance from a fixed point, where the fixed point is used as a principal point in the calibration data. The system where the edit is at least one or more of rotation, cropping, flipping, skewing, or shearing. The system including storage to store the calibration data as a floating point number. The system where the image data is stored as integer values. The system where the edited depth enhanced image includes an original set of calibration data with linear transformation operations made on the depth data, the image data, and calibration data for the reversion to an original depth enhanced image. The system where the edited depth enhanced image is returned in a container including an indicator that the edited calibration data is read prior to the depth data and edited image data. The system where the edited depth enhanced image is returned in a container formatted to have an extensible device metadata format. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including means for storing calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. Implementations of the described techniques may include hardware, a method or process, or computer software on a computer-accessible medium.

Example 3

One general aspect includes a tangible, non-transitory, computer-readable medium including instructions that, when executed by a processor, direct the processor to: store a received depth enhanced image including image data, depth data, and calibration data. The tangible also includes apply an edit to the image data and the calibration data without editing the depth data in response to a request for an image edit. The tangible also includes return an edited depth enhanced image. Other embodiments of this aspect include corresponding computer systems, apparatus, and computer programs recorded on one or more computer storage devices, each configured to perform the actions of the methods.

Implementations may include one or more of the following features. The computer-readable medium where the edit is a linear transformation of intrinsic parameter through matrix multiplication. The computer-readable medium where the edit is a linear transformation of extrinsic parameter through matrix multiplication. The computer-readable medium where the depth data indicates a distance from a fixed point, where the fixed point is used as a principal point in the calibration data. The computer-readable medium where the edit is at least one or more of rotation, cropping, flipping, skewing, or shearing. The computer-readable medium where the calibration data is stored in the computer-readable medium as a floating point number. The computer-readable medium where the image data is stored as integer values. The computer-readable medium where the edited depth enhanced image includes an original set of calibration data with linear transformation operations made on the depth data, the image data, and calibration data for the reversion to an original depth enhanced image. The computer-readable medium where the edited depth enhanced image is returned in a container including an indicator that the edited calibration data is read prior to the depth data and edited image data. The computer-readable medium where the edited depth enhanced image is returned in a container formatted to have an extensible device metadata format. The system where the edit is a linear transformation of an intrinsic parameter through matrix multiplication. The system where the edit is a linear transformation of an extrinsic parameter through matrix multiplication. The system where the depth data indicates a distance from a fixed point, where the fixed point is used as a principal point in the calibration data. The system where the edit is at least one or more of rotation, cropping, flipping, skewing, or shearing. The system including storage to store the calibration data as a floating point number. The system where the image data is stored as integer values. The system where the edited depth enhanced image includes an original set of calibration data with linear transformation operations made on the depth data, the image data, and calibration data for the reversion to an original depth enhanced image. The system where the edited depth enhanced image is returned in a container including an indicator that the edited calibration data is read prior to the depth data and edited image data. The system where the edited depth enhanced image is returned in a container formatted to have an extensible device metadata format. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including means for storing calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. Implementations of the described techniques may include hardware, a method or process, or computer software on a computer-accessible medium.

Example 4

One general aspect includes a system for a depth enhanced image including: a processor, a storage including instructions that when executed with the processor cause the apparatus to store a received depth enhanced image including image data, depth data, and calibration data. The system also includes apply an edit to the image data and the calibration data without editing the depth data in response to a request for an image edit. The system also includes return an edited depth enhanced image. Other embodiments of this aspect include corresponding computer systems, apparatus, and computer programs recorded on one or more computer storage devices, each configured to perform the actions of the methods.

Implementations may include one or more of the following features. The system where the edit is a linear transformation of an intrinsic parameter through matrix multiplication. The system where the edit is a linear transformation of an extrinsic parameter through matrix multiplication. The system where the depth data indicates a distance from a fixed point, where the fixed point is used as a principal point in the calibration data. The system where the edit is at least one or more of rotation, cropping, flipping, skewing, or shearing. The system including storage to store the calibration data as a floating point number. The system where the image data is stored as integer values. The system where the edited depth enhanced image includes an original set of calibration data with linear transformation operations made on the depth data, the image data, and calibration data for the reversion to an original depth enhanced image. The system where the edited depth enhanced image is returned in a container including an indicator that the edited calibration data is read prior to the depth data and edited image data. The system where the edited depth enhanced image is returned in a container formatted to have an extensible device metadata format. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including means for storing calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. Implementations of the described techniques may include hardware, a method or process, or computer software on a computer-accessible medium.

Example 5

One general aspect includes a system for a depth enhanced image including: a processor, a storage including instructions that when executed with the processor cause the apparatus to store a received depth enhanced image including image data, depth data, and calibration data. The system also includes apply an edit to the image data and the calibration data without editing the depth data in response to a request for an image edit. The system also includes return an edited depth enhanced image. Other embodiments of this aspect include corresponding computer systems, apparatus, and computer programs recorded on one or more computer storage devices, each configured to perform the actions of the methods.

Implementations may include one or more of the following features. The apparatus where the edit is a linear transformation of an intrinsic parameter through matrix multiplication. The apparatus where the edit is a linear transformation of an extrinsic parameter through matrix multiplication. The apparatus where the depth data indicates a distance from a fixed point, where the fixed point is used as a principal point in the calibration data. The apparatus where the edit is at least one or more of rotation, cropping, flipping, skewing, or shearing. The apparatus including means for storing calibration data as a floating point number. The apparatus where the image data is stored as integer values. The apparatus where the edited depth enhanced image includes an original set of calibration data with linear transformation operations made on the depth data, the image data, and calibration data for the reversion to an original depth enhanced image. The apparatus where the edited depth enhanced image is returned in a container including an indicator that the edited calibration data is read prior to the depth data and edited image data. The apparatus where the edited depth enhanced image is returned in a container formatted to have an extensible device metadata format. Implementations of the described techniques may include hardware, a method or process, or computer software on a computer-accessible medium.

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. In yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It may be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the same embodiment.

What is claimed is:

1. An image editing apparatus for a depth enhanced image comprising:
    a processor;
    a storage including instructions that when executed by the processor cause the apparatus to:
        store a received depth enhanced image including image data, depth data, and calibration data;
        apply an edit to the image data and the calibration data without editing the depth data in response to a request for an image edit; and
        return an edited depth enhanced image.

2. The apparatus of claim 1, wherein the edit is a linear transformation of an intrinsic parameter through matrix multiplication.

3. The apparatus of claim 1, wherein the edit is a linear transformation of an extrinsic parameter through matrix multiplication.

4. The apparatus of claim 1, wherein the depth data indicates a distance from a fixed point, where the fixed point is used as a principal point in the calibration data.

5. The apparatus of claim 1, wherein the edit is at least one or more of rotation, cropping, flipping, skewing, or shearing.

6. The apparatus of claim 1, wherein the calibration data is stored as a floating point number.

7. The apparatus of claim 1, wherein the image data is stored as integer values.

8. The apparatus of claim 1, wherein the edited depth enhanced image includes an original set of calibration data with linear transformation operations made on the depth data, the image data, and the calibration data for a reversion to an original depth enhanced image.

9. The apparatus of claim 1, wherein the edited depth enhanced image is returned in a container including an indicator that the edited calibration data is read prior to the depth data and the edited image data.

10. The apparatus of claim 1, wherein the edited depth enhanced image is returned in a container formatted to have an extensible device metadata format.

11. A method for editing depth enhanced images comprising:
    storing a received depth enhanced image including image data, depth data, and calibration data;
    applying an edit to the image data and the calibration data without editing the depth data in response to a request for an image edit; and
    returning an edited depth enhanced image.

12. The method of claim 11, wherein the edit is a linear transformation of an intrinsic parameter through matrix multiplication.

13. The method of claim 11, wherein the edit is a linear transformation of an extrinsic parameter through matrix multiplication.

14. The method of claim 11, wherein the depth data indicates a distance from a fixed point, where the fixed point is used as a principal point in the calibration data.

15. The method of claim 11, wherein the edit is at least one or more of rotation, cropping, flipping, skewing, or shearing.

16. The method of claim 11, wherein the calibration data is stored as a floating point number.

17. The method of claim 11, wherein the image data is stored as integer values.

18. The method of claim 11, wherein the edited depth enhanced image includes an original set of calibration data with linear transformation operations made on the depth data, the image data, and the calibration data for a reversion to an original depth enhanced image.

19. The method of claim 11, wherein the edited depth enhanced image is returned in a container including an indicator that the edited calibration data is read prior to the depth data and the edited image data.

20. The method of claim 11, wherein the edited depth enhanced image is returned in a container formatted to have an extensible device metadata format.

21. A tangible, non-transitory, computer-readable medium comprising instructions that, when executed by a processor, direct the processor to:
- store a received depth enhanced image including image data, depth data, and calibration data;
- apply an edit to the image data and the calibration data without editing the depth data in response to a request for an image edit; and
- return an edited depth enhanced image.

22. The computer-readable medium of claim 21, wherein the edit is a linear transformation of an intrinsic parameter through matrix multiplication.

23. The computer-readable medium of claim 21, wherein the edit is a linear transformation of an extrinsic parameter through matrix multiplication.

24. The computer-readable medium of claim 21, wherein the depth data indicates a distance from a fixed point, where the fixed point is used as a principal point in the calibration data.

25. The computer-readable medium of claim 21, wherein the edit is at least one or more of rotation, cropping, flipping, skewing, or shearing.

* * * * *